United States Patent
Jung

(10) Patent No.: US 9,609,615 B2
(45) Date of Patent: Mar. 28, 2017

(54) METHOD FOR BUILDING DATABASE FOR FINGERPRINTING POSITIONING AND FINGERPRINTING POSITIONING METHOD USING THE BUILT DATABASE

(71) Applicant: Hyundai Mobis Co., Ltd., Seoul (KR)

(72) Inventor: Jong In Jung, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 37 days.

(21) Appl. No.: 14/722,940

(22) Filed: May 27, 2015

(65) Prior Publication Data

US 2016/0165566 A1 Jun. 9, 2016

(30) Foreign Application Priority Data

Dec. 4, 2014 (KR) ........................ 10-2014-0173387

(51) Int. Cl.
| | | |
|---|---|---|
| *H04W 64/00* | (2009.01) | |
| *H04W 4/02* | (2009.01) | |
| *G01S 5/02* | (2010.01) | |
| *H04W 84/12* | (2009.01) | |

(52) U.S. Cl.
CPC ............ *H04W 64/00* (2013.01); *G01S 5/0252* (2013.01); *H04W 4/02* (2013.01); *H04W 84/12* (2013.01)

(58) Field of Classification Search
CPC ....... H04W 64/00; H04W 4/02; H04W 84/12; G01S 5/0252
See application file for complete search history.

(56) References Cited

U.S. PATENT DOCUMENTS

| | | | | |
|---|---|---|---|---|
| 8,077,090 B1* | 12/2011 | Chintalapudi | ........ | G01S 5/0252 342/450 |
| 8,996,032 B2* | 3/2015 | Alizadeh-Shabdiz | ............................. | G01S 5/0278 455/456.1 |
| 2012/0149415 A1* | 6/2012 | Valaee | ................. | H04W 64/00 455/507 |
| 2014/0011518 A1* | 1/2014 | Valaee | ................. | G01S 5/0252 455/456.1 |
| 2014/0120931 A1* | 5/2014 | Shin | ...................... | H04W 64/00 455/452.1 |
| 2015/0237471 A1* | 8/2015 | Li | ........................ | H04W 4/021 455/456.2 |
| 2015/0249907 A1* | 9/2015 | Gupta | .................. | H04W 4/043 455/456.1 |
| 2015/0281910 A1* | 10/2015 | Choudhury | ............. | G01S 5/021 455/456.1 |

FOREIGN PATENT DOCUMENTS

| | | |
|---|---|---|
| KR | 10-2010-0045355 | 5/2010 |
| KR | 10-2012-0010114 | 2/2012 |
| KR | 10-2012-0088324 | 8/2012 |
| KR | 10-1390722 | 4/2014 |

* cited by examiner

*Primary Examiner* — Chieh M Fan
*Assistant Examiner* — Eboni Hughes
(74) *Attorney, Agent, or Firm* — H.C. Park & Associates, PLC

(57) ABSTRACT

A method for building a database for fingerprinting positioning including: generating, by a database building device, raw data by collecting received signal strengths (RSSs) for access points (APs) at each sample point (SP); and generating a cluster table by clustering SPs for each of the APs according to the RSS for the AP, using the generated raw data.

11 Claims, 16 Drawing Sheets

FIG. 4

METHOD FOR BUILDING DATABASE FOR FINGERPRINTING POSITIONING AND FINGERPRINTING POSITIONING METHOD USING THE BUILT DATABASE

CROSS-REFERENCES TO RELATED APPLICATION

The application claims priority from and the benefit of Korean Patent Application No. 10-2014-0173387, filed on Dec. 4, 2014, which is hereby incorporated by reference for all purposes as if fully set forth herein.

BACKGROUND

Field

Exemplary embodiments relate to a method for building a database for fingerprinting positioning and a fingerprinting positioning method using the built database. More particularly, exemplary embodiments relate to a method for building a database for fingerprinting positioning and a fingerprinting positioning method using the built database, which use a clustering scheme.

Discussion of the Background

Recently, with the increase in the use of smart phones, the market related to a Location Based Service (LBS) for providing various services using location information has rapidly grown. "LBS" refers to a location information-based system and service which comprehensively utilizes a mobile communication network and information technology (IT), such as a mobile phone or PDA. The LBS provides various pieces of information related to daily lives, such as product information, traffic information, and location tracking information, based on a customer's location information. The LBS is generally divided into Location Determination Technology (LDT), Location Enabled Platform (LEP), and Location Application Program (LAP).

Among the technologies, the LDT for determining the location of a device receiving the LBS corresponds to the most necessary technology for providing the LBS. Conventionally, the Global Positioning System (GPS), or a system using base stations for mobile phones, has been frequently used as the LDT.

However, GPS may generally have an error of up to several meters, and cannot determine a location in a shadow region, such as the inside of a building or a tunnel. Unlike GPS, the system using base stations for mobile phones can determine a location both inside and outside. However, because such a system is not very precise, the system can only approximately check in which block a device is located.

As a method for overcoming the imprecision of the GPS or the system using base stations and accurately measuring a location, a method using a sensor can be used, including the Radio Frequency Identification (RFID) or Ultra Wire Band (UWB) system. The UWB system has an advantage in that it can provide a precision as high as several centimeters with regard to indoor location tracking Thus, the UWB system is mainly utilized in a real-time location tracking system which requires location precision. However, although the systems exhibit high precision, the systems have a short transmit/receive distance, and require separate base stations for positioning. Thus, an enormous cost is inevitably spent in initially constructing the systems.

In order to overcome such problems, there is a need for a technology which exhibits relatively high precision and requires a small amount of extra cost for positioning. Recently, research has been actively conducted on a positioning technology using wireless access points (APs), which can satisfy such a need. That is because, since APs of wireless LAN (WLAN) for determining a location using wireless APs are already installed at a large number of places, separate base stations do not need to be additionally installed.

Such a positioning technology using wireless access points may be divided into two methods. One is a centroid method. This method receives Received Signal Strengths (RSSs) from three or more APs, and estimates a current location of a user.

The other one is a fingerprinting method. This method stores RSS data for each AP that are received from locations corresponding to a plurality of predetermined sample points (SPs). Then, when a similar RSS is measured, the method estimates the location of a user using the location of the corresponding SP.

However, the conventional fingerprinting positioning method has a problem in that, when the service area is widened, it requires a large capacity for storing RSS data. Furthermore, as the database is expanded, a search range is widened. Thus, an undesirably long period of time may be required for estimating a location.

The related art of the present invention is disclosed in Korean Patent Application No. 10-1390722, published on Apr. 24, 2014.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide a method for building a database for fingerprinting positioning and a fingerprinting positioning method using the built database, which are capable of reducing the volume of the database, enabling rapid location determination, and improving the precision of location estimation.

Additional aspects will be set forth in the detailed description which follows, and, in part, will be apparent from the disclosure, or may be learned by practice of the inventive concept.

An exemplary embodiment discloses a method for building a database for fingerprinting positioning including: generating, by a database building device, raw data by collecting received signal strengths (RSSs) for access points (APs) at each sample point (SP); and generating a cluster table by clustering SPs for each of the APs according to the RSS for the AP, using the generated raw data.

An exemplary embodiment also discloses: a fingerprinting positioning method using a built database may including: measuring, by a location estimation device, RSSs for APs; determining a search region for location estimation using the measured RSSs and a cluster table contained in the built database; and estimating a current location of the location estimation device by performing fingerprinting positioning in the determined search region.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

FIG. 4 is a diagram for describing a step of estimating a signal attenuation rate per distance in the method for building a database for fingerprinting positioning in accordance with an exemplary embodiment of the present invention.

DESCRIPTION OF THE ILLUSTRATED EMBODIMENTS

Figure 1:
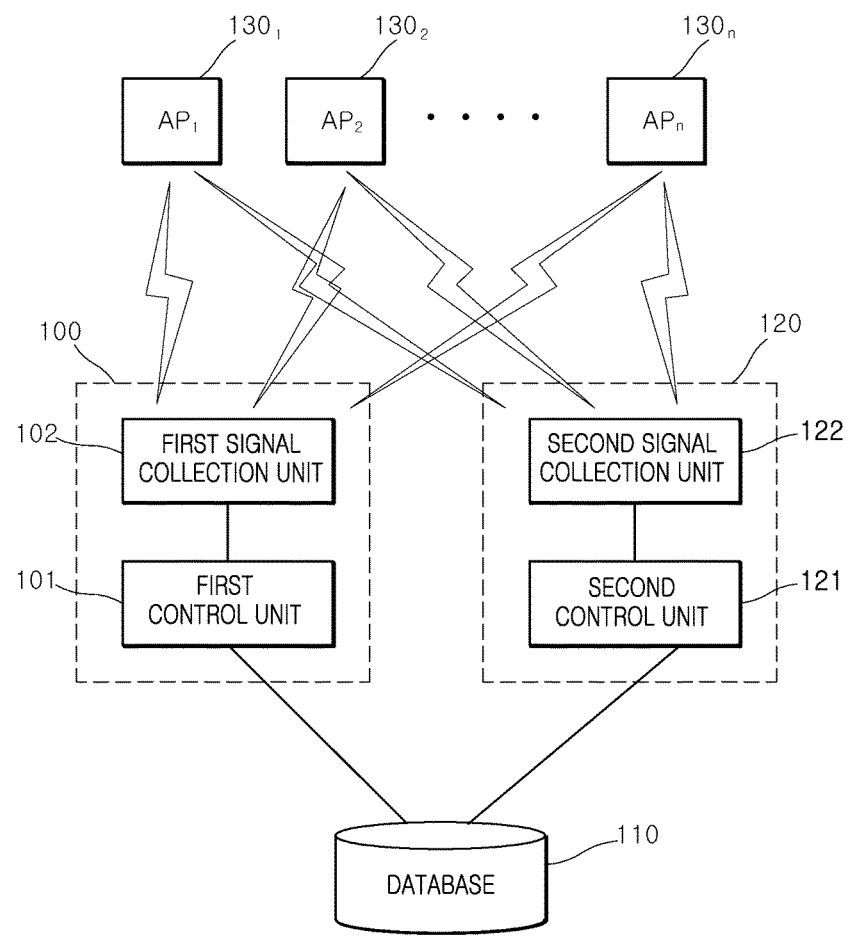
FIG. 1 is a diagram illustrating an apparatus for performing a method for building a database for fingerprinting positioning and a fingerprinting positioning method using the built database in accordance with an exemplary embodiment of the present invention.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of various elements may be exaggerated for clarity and descriptive purposes. Also, like reference numerals denote like elements.

As used herein, the term "and/or" includes any and all combinations of one or more of the associated listed items.

Although the terms first, second, etc. may be used herein to describe various elements, components, and/or sections, these elements, components, and/or sections should not be limited by these terms. These terms are used to distinguish one element, component, and/or section from another element, component, and/or section. Thus, a first element, component, and/or section discussed below could be termed a second element, component, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

FIG. 1 is a diagram illustrating an apparatus for performing a method for building a database for fingerprinting positioning and a fingerprinting positioning method using the built database in accordance with an exemplary embodiment of the present invention. As illustrated in FIG. 1, the apparatus for performing the method for building a database for fingerprinting positioning and the fingerprinting positioning method using the built database in accordance with an exemplary embodiment of the present invention may include a database building device 100 and a location estimation device 120. The database building device 100 may include a first control unit 101 and a first signal collection unit 102, and the location estimation device 120 may include a second control unit 121 and a second signal collection unit 122.

The database building device 100 may receive signals from access points (AP) $130_1$ to $130_n$ through the first signal collection unit 102 at each sample point (SP), and collect RSSs (Received Signal Strengths) for the respective APs.

Furthermore, the first control unit 101 of the database building device 100 may construct a radio map using the collected RSSs as raw data, and generate a cluster table. The first control unit 101 may store the built radio map and cluster table in a database 110.

That is, the database 110 may include the radio map which stores the RSSs for the respective APs at each SP and the cluster table which stores a final center value of a cluster for each AP, generated by clustering SPs for the AP according to the RSS, and a list of SPs included in the center value. The database 110 may be constructed in the form of a server, or included in the database building device 100.

The location estimation device 120 may estimate a current location thereof by performing fingerprinting positioning using the radio map and the cluster table, which are stored in the database. That is, the second signal collection unit 122 may receive signals from the APs $130_1$ to $130_n$ and measure the RSSs for the respective APs. The second control unit 121 may compare the measured RSSs to the data stored in the database, and estimate the current location of the location estimation device 120. The location estimation device 120 may correspond to a user's smart phone or the like.

Referring to FIGS. 2 to 10, the method for building a database for fingerprinting positioning in accordance with an exemplary embodiment of the present invention will be described as follows.

Figure 2:
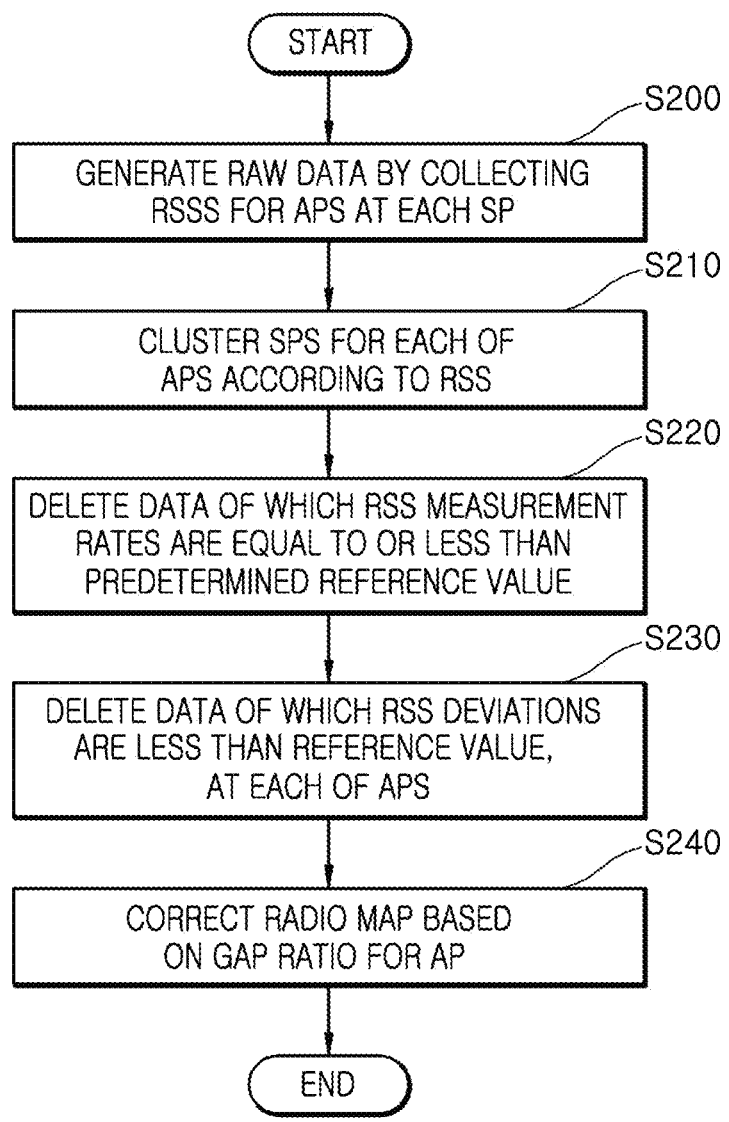
FIG. 2 is a flowchart for describing the method for building a database for fingerprinting positioning in accordance with an exemplary embodiment of the present invention.

As illustrated in FIG. 2, the database building device 100 may generate raw data by collecting RSSs for the respective APs at each SP, at step S200. That is, the database building device 100 may collect the RSSs for the respective APs, measured at a plurality of predetermined SPs, as identifiers for the plurality of SPs. At this time, the database building device 100 may generate the raw data by repetitively measuring the RSSs for the respective APs at each of the SPs.

Then, the database building device 100 may cluster SPs for each AP according to the RSS for the AP, using the raw data generated at step S200, at step S210. Referring to FIGS. 3 to 6, a clustering process for one AP will be described as follows.

Figure 3:
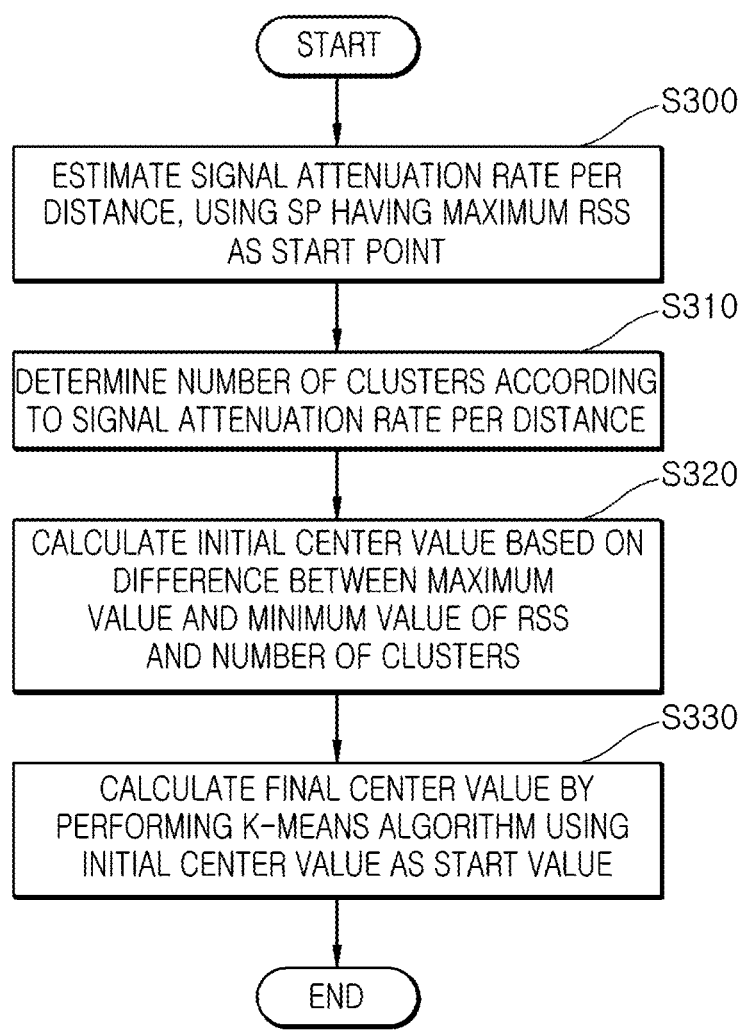
FIG. 3 is a flowchart for describing a step of clustering SPs according to an RSS in the method for building a database for fingerprinting positioning in accordance with an exemplary embodiment of the present invention.
Figure 4:
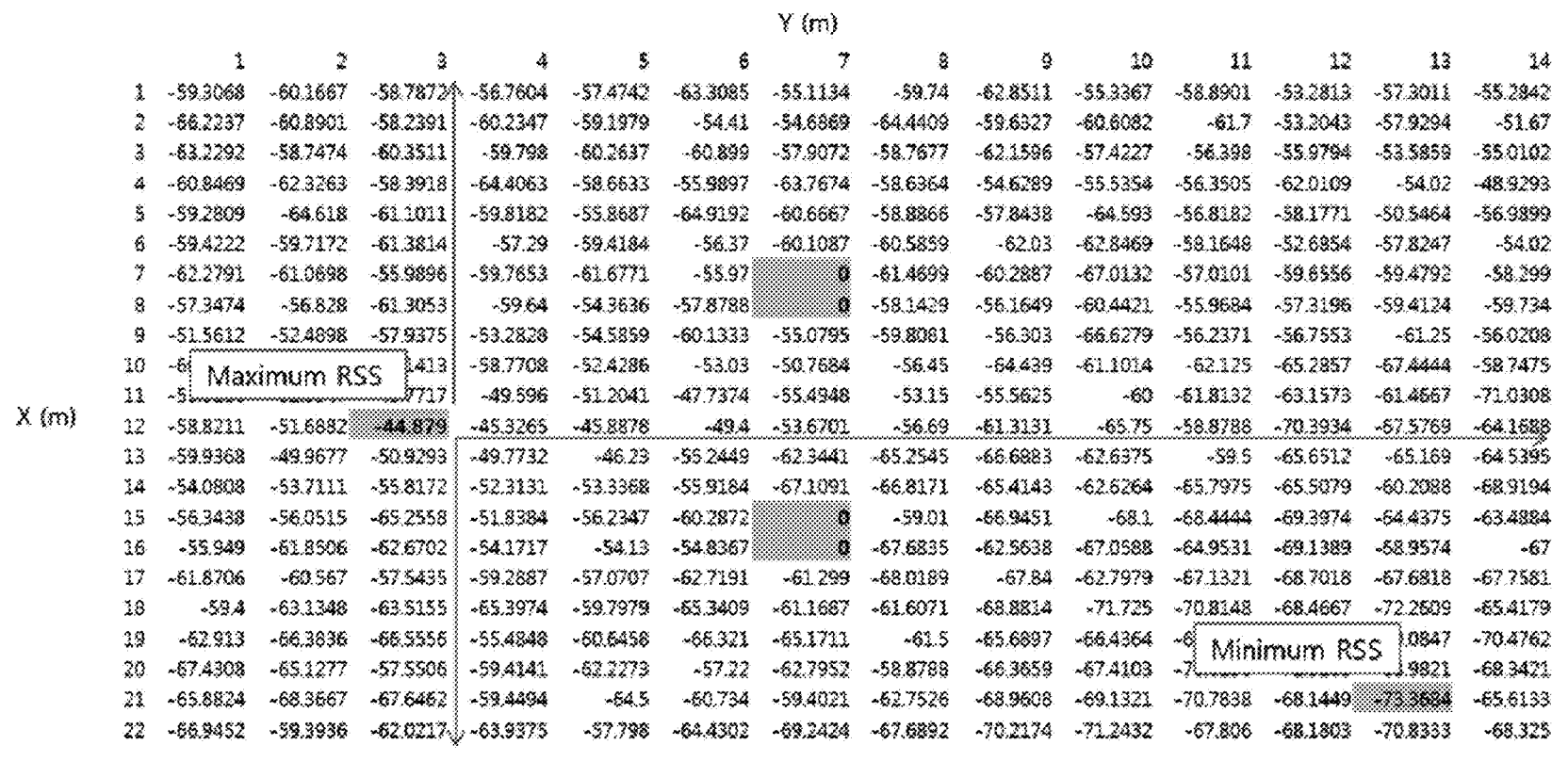

As illustrated in FIG. 3, the database building device 100 may estimate a signal attenuation rate per distance in a state where the SP having the maximum RSS for an arbitrary AP is set to the start point, at step S300. As illustrated in FIG. 4, the database building device 100 may estimate a rate of RSS which attenuates according to the distance in a state where the SP having the maximum RSS is set to the start point. That is, the database building device 100 may estimate rates of RSS which attenuates according to the distance in four directions, in a state where an SP indicated by Maximum RSS in FIG. 4 is set to the start point.

The database building device 100 may estimate a signal attenuation rate per distance by calculating a mean or taking the maximum value of the estimated attenuation rates in the four directions. The reason for estimating the signal attenuation rate per distance is in order to determine an initial interval between clusters by reflecting the density of RSSs (the distribution of RSSs).

That is, during a clustering operation using an unsupervised learning algorithm, the initial center value needs to be set. The initial center value may have an important influence on the result of the unsupervised learning algorithm. In other words, the unsupervised learning algorithm does not guarantee an optimal value as the performance result thereof, but acquires a result which considerably relies on the initial condition. Thus, depending on the initial settings, the unsupervised learning algorithm may acquire a value less optimal than the actual optimal value. In order to prevent such a result, the best result among a plurality of results obtained by using different initial values may be selected. In the present exemplary embodiment, however, the initial interval between clusters may be determined according to the density of RSSs.

At step S300, the database building device 100 may estimate the signal attenuation rate per distance using a method of least squares. That is, the database building device 100 may search for a straight line having the maximum approximate value for given data, using the method of least squares, and estimate the slope of the line as the rate of RSS which attenuates according to the distance.

After step S300, the database building device 100 may determine the number of clusters according to the signal attenuation rate per distance, calculated at step S300, at step S310. For example, the database building device 100 may calculate the initial interval between clusters by multiplying the signal attenuation rate per distance by the size of a cluster region (for example, 10 m, 20 m or the like). Furthermore, the database building device 100 may determine the number of clusters by dividing a value, obtained by subtracting the minimum value of the RSS from the maximum value of the RSS, that is, the maximum interval between RSSs, by the calculated signal attenuation rate per distance. That is, the database building device 100 may calculate the initial interval between clusters by multiplying the size of the cluster region, set according to a user's intention or the like, by the signal attenuation rate per distance, and determine the number of clusters by reflecting the density of RSSs, which is obtained by dividing the calculated initial interval by the maximum interval between RSSs.

The database building device 100 may calculate the initial center value of the clusters, based on a difference between the maximum value and the minimum value of the RSS, and the number of clusters determined at step S310, at step S320. For example, the database building device 100 may calculate the center value of an m-th cluster through Equation 1 below.

$$R_{min} + \left(m - \frac{1}{2}\right) \times \frac{R_{max} - R_{min}}{CN} \qquad \text{[Equation 1]}$$

Here, $R_{min}$ represents the minimum value of the RSS, $R_{max}$ represents the maximum value of the RSS, and CN represents the number of clusters.

That is, the database building device 100 may calculate the center values from the center value of the first cluster to the center value of (the number of clusters determined at step S310)-th cluster. Thus, the initial center value of the clusters may indicate a group of the center values of which the number corresponds to the number of clusters determined at step S310.

Figure 5:
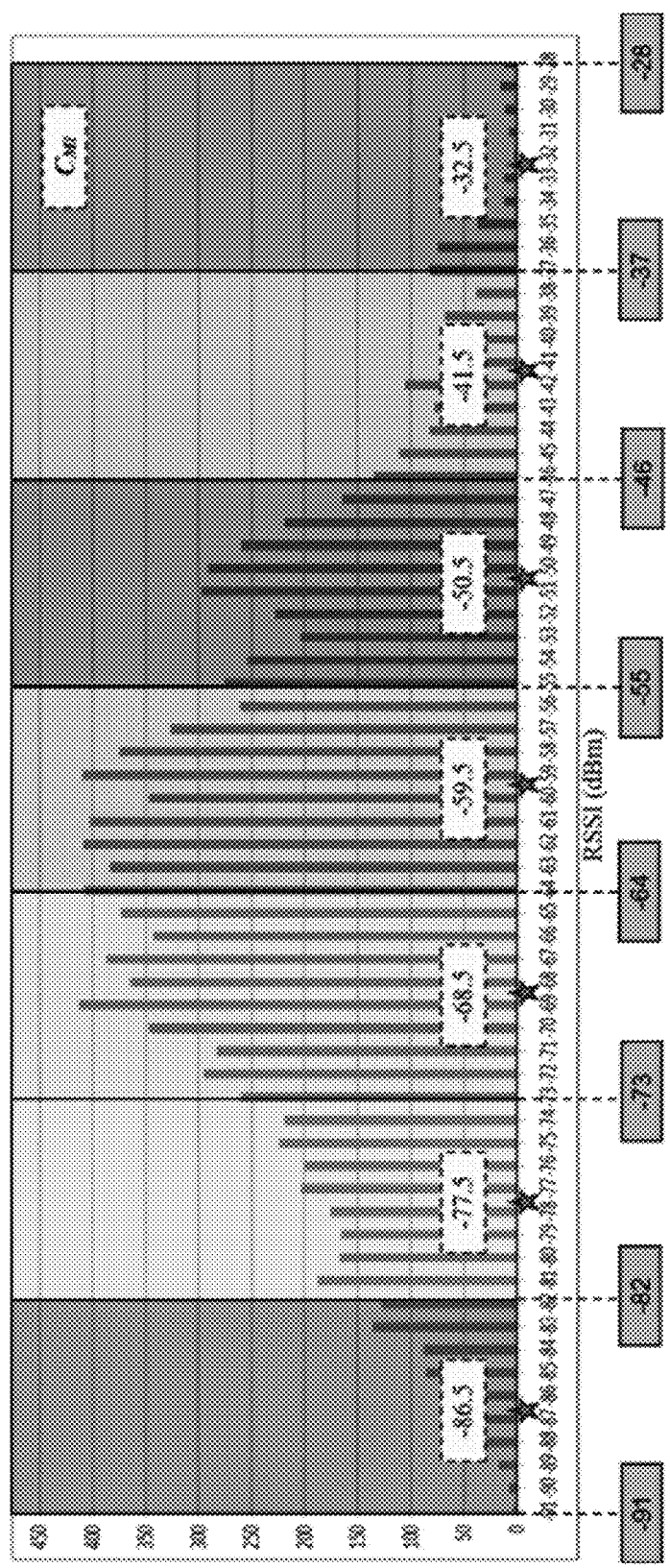
FIG. 5 is a diagram for describing a step of calculating the initial center value in the method for building a database for fingerprinting positioning in accordance with an exemplary embodiment of the present invention.

The database building device 100 may generate the initial cluster model as illustrated in FIG. 5, through the above-described process.

Figure 6:
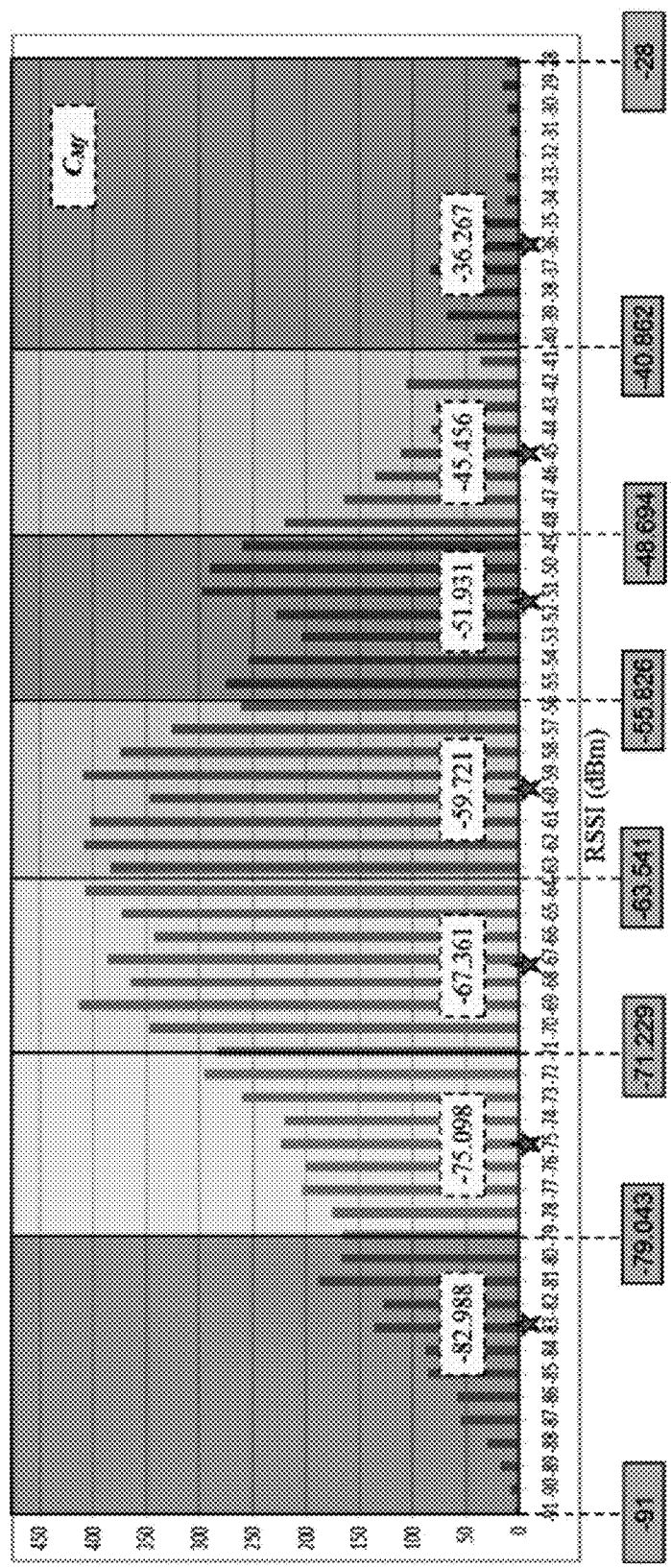
FIG. 6 is a diagram for describing a step of calculating the final center value in the method for building a database for fingerprinting positioning in accordance with an exemplary embodiment of the present invention.

After step S320, the database building device 100 may calculate the final center value of the clusters for an arbitrary AP through the performance of the unsupervised learning algorithm using the initial center value calculated at step S320 as the start value, at step S330. That is, the database building device 100 may generate the final cluster model as illustrated in FIG. 6 by performing the unsupervised learning algorithm.

At this time, the database building device 100 may calculate the final center value of the clusters using the K-means algorithm as the unsupervised learning algorithm. That is, the database building device 100 may perform clustering while minimizing dispersion of distance differences from the clusters. In other words, the database building device 100 may narrow the range of a cluster including a large number of data and widen the range of a cluster including a small number of data, thereby reducing the deviation between the respective clusters in comparison to the initial model.

The final center value may indicate a group including center values of which the number corresponds to the number of clusters determined at step S310, like the initial center value at step S320.

At step S210 of FIG. 2, the database building device 100 may perform steps S300 to S330 of FIG. 3 for each AP, and generate a cluster table by clustering SPs for each AP according to the RSS for the AP. Thus, the generated cluster table may include the final center value of the clusters for each AP and a list of SPs contained in each of the center values.

Figure 7:
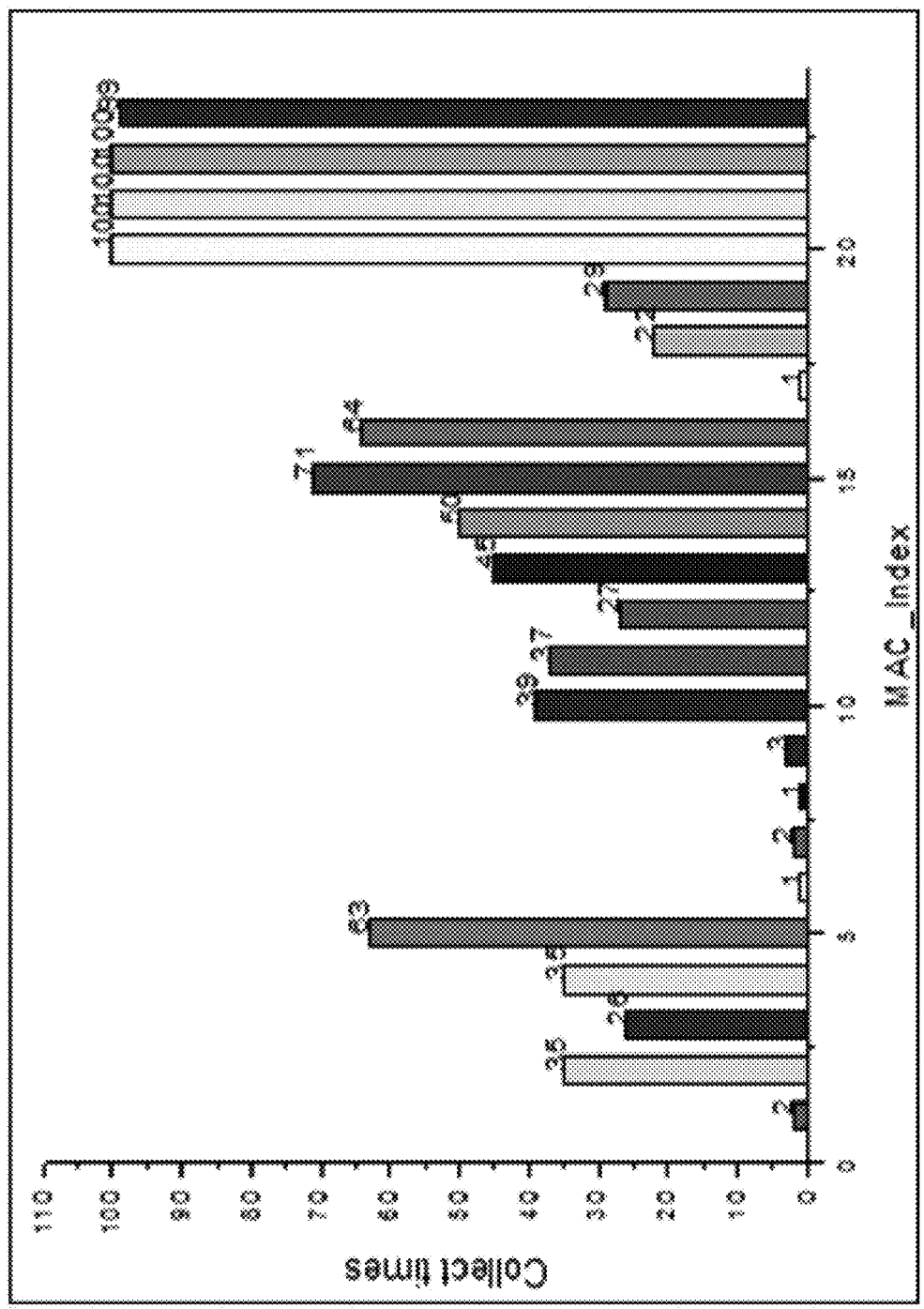
FIG. 7 is a diagram for describing a step of deleting data of which RSS measurement rates are equal to or less than a predetermined reference value in the method for building a database for fingerprinting positioning in accordance with an exemplary embodiment of the present invention.

After step S210, the database building device 100 may delete data of which the RSS measurement rate is equal to or less than a predetermined reference value, from the raw data generated at step S200, at step S220. As illustrated in FIG. 7, when the database building device 100 generates the raw data by repetitively measuring the RSSs for the respective APs at each SP, the number of measurements for each of the APs may be accumulated. The database building device 100 may delete data of which the RSS measurement rate is equal to or less than the reference value, based on the accumulated number of measurements.

That is, in the case of an AP in which the number of collect times for RSS at one SP is considerably lower than the total number of measurements(equal to or less than a predetermined reference number), the AP may not be measured at an actual positioning step. Thus, the radio map may be optimized by deleting the data of the corresponding AP for the corresponding SP from the raw data. For example, data of an SP for five APs in which the number of collect times is equal to or less than five, among the APs illustrated in FIG. 7, may be deleted.

Figure 8:
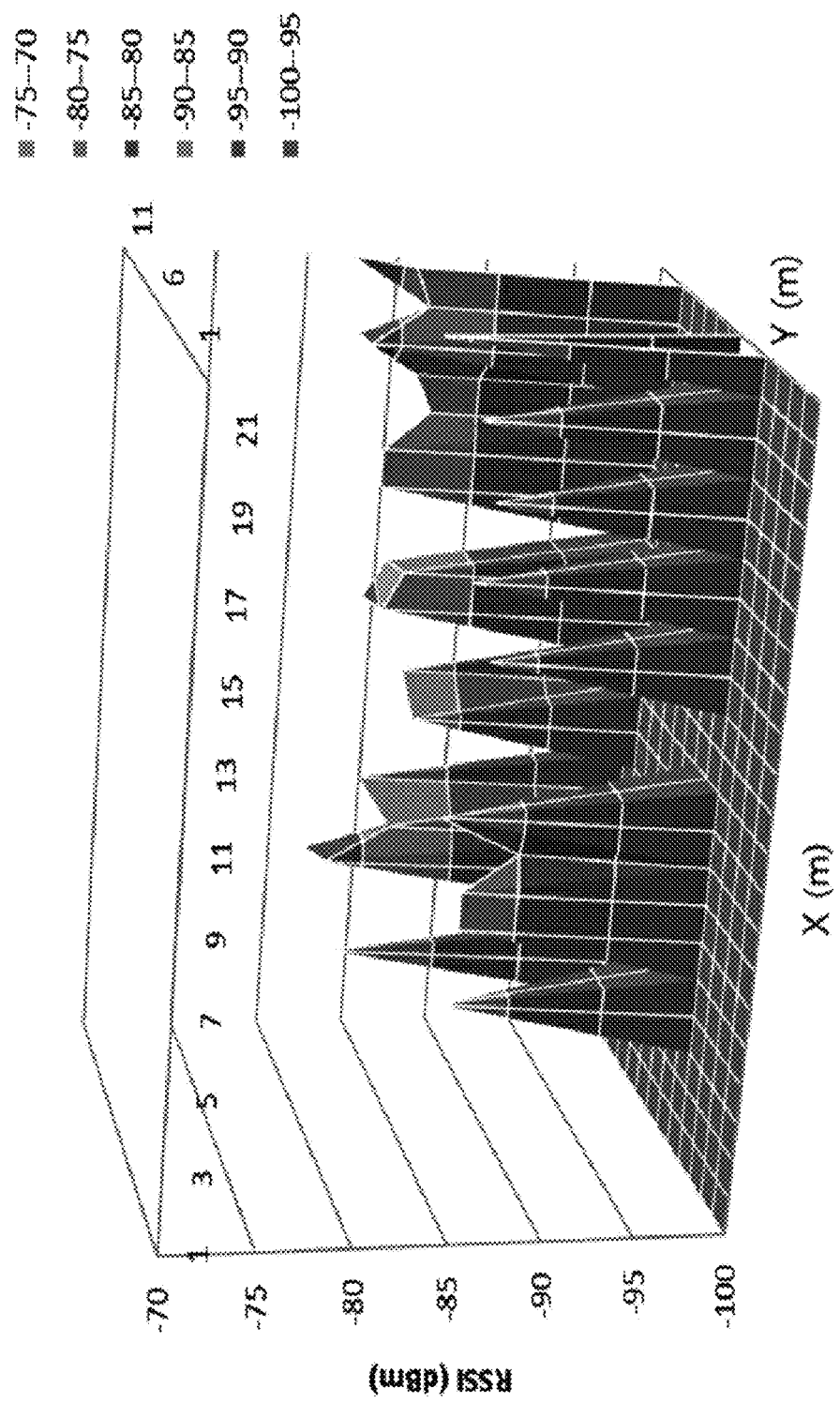
FIG. 8 is a diagram for describing a step of deleting data of which RSS deviations are less than a reference value in the method for building a database for fingerprinting positioning in accordance with an exemplary embodiment of the present invention.

Then, the database building device 100 may delete data of which RSS deviations are less than a reference value, in each AP, at step S230. That is, based on one AP, different SPs need to have different RSSs. However, SPs of which the RSSs have almost no difference therebetween may serve as errors at the actual positioning step. Thus, the radio map may be optimized by deleting the data of the corresponding AP for the SPs from the raw data. As illustrated in FIG. 8, data of an AP corresponding to SPs which are different from each other but have a small deviation in RSS may be deleted. The reference value is not a fixed value, but may differ depending on the distance between the respective SPs.

The database building device 100 may optimize the radio map by deleting data for APs, collected only at one SP. That is because, since such data have a meaning only for the corresponding SP, the data may serve as an error at the actual positioning step.

Figure 9:
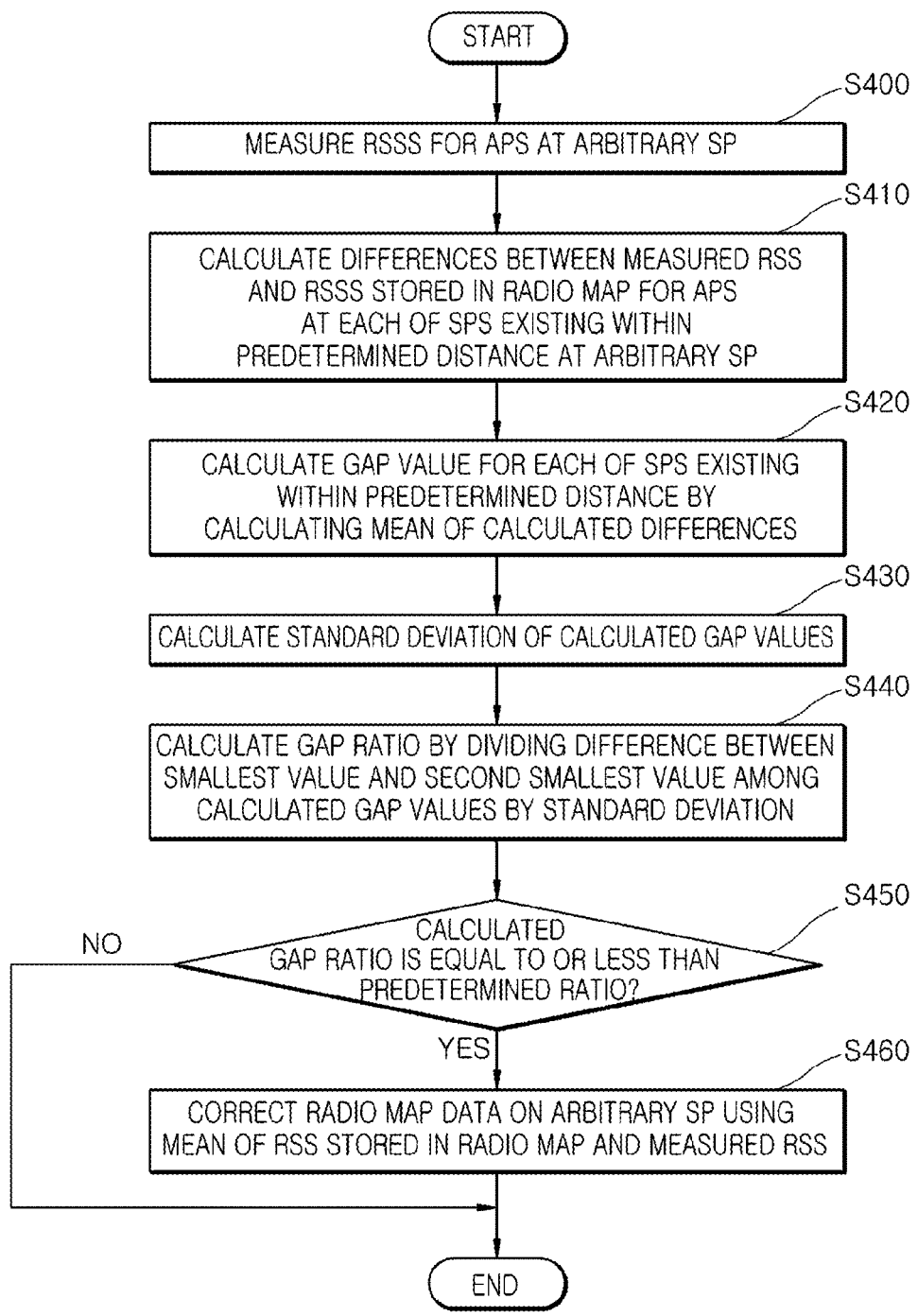
FIG. 9 is a flowchart for describing a step of correcting a radio map based on a gap ratio in the method for building a database for fingerprinting positioning in accordance with an exemplary embodiment of the present invention.
Figure 10:
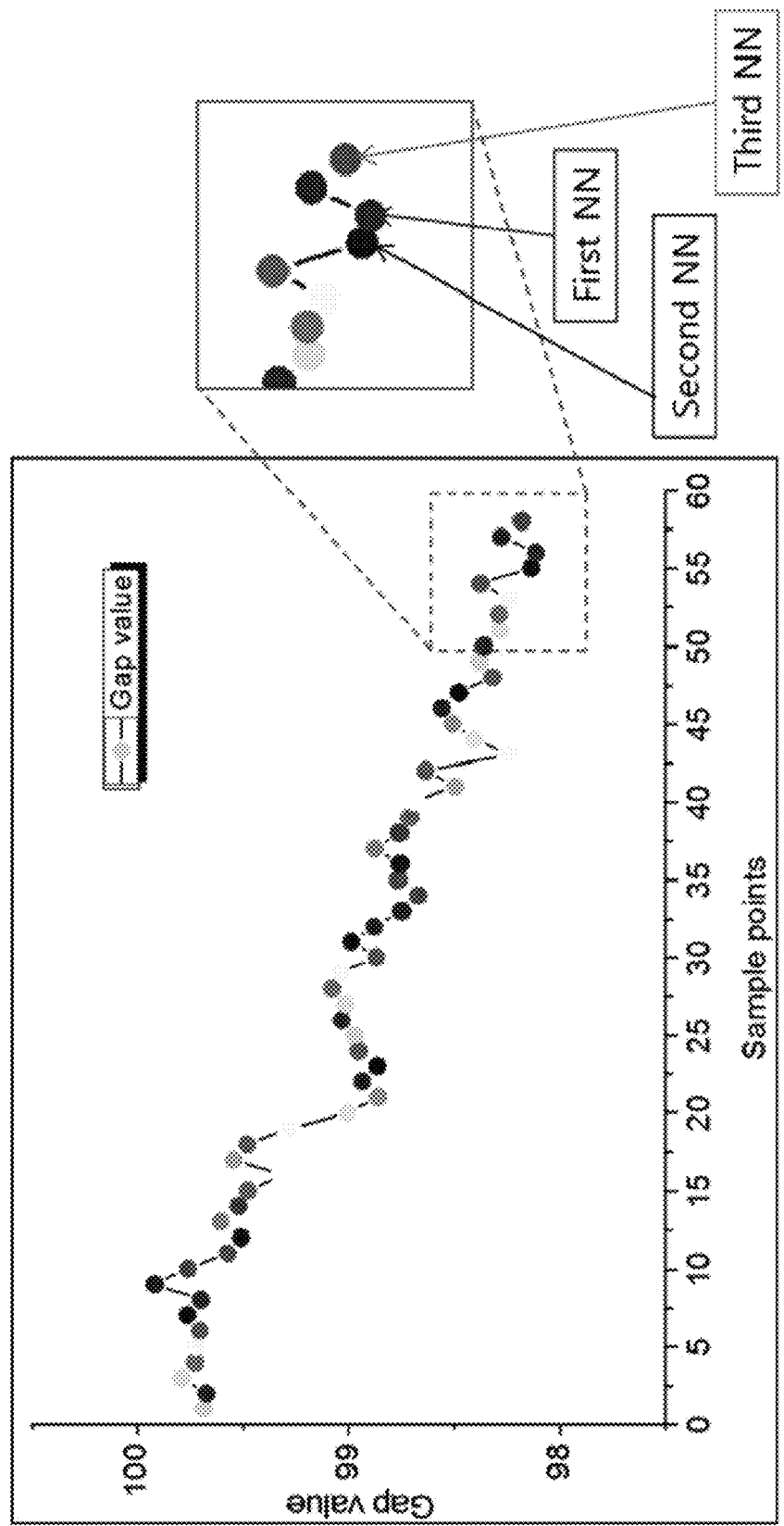
FIG. 10 is a diagram for describing a process of calculating a gap ratio in the method for building a database for fingerprinting positioning in accordance with an exemplary embodiment of the present invention.

After step S230, the database building device 100 may correct radio map data on an arbitrary SP, based on a gap ratio indicating a difference in RSS stored in the radio map between the arbitrary SP and another SP adjacent to the arbitrary SP, at step S240. Referring to FIGS. 9 and 10, step S240 will be described in more detail as follows.

As illustrated in FIG. 9, the database building device 100 may measure RSSs for the respective APs at an arbitrary SP, at step S400. That is, the database building device 100 may measure the RSSs for the respective APs at an arbitrary SP, and check whether the data of the corresponding SP need to be corrected, in order to maintain and repair the radio map, after the radio map is constructed.

Then, the database building device 100 may calculate differences by subtracting the RSSs measured at step S400 from the RSSs stored in the radio map for the respective APs for each of SPs existing within a predetermined distance from an arbitrary SP, at step S410. That is, the database building device 100 may calculate differences by subtracting the measured RSSs from the RSSs stored in the radio map, in order to compare the arbitrary SP and the SPs existing within the predetermined distance from the arbitrary SP. Here, differences for one SP may include difference values of the respective APs for the corresponding SP.

After step S410, the database building device 100 may calculate a mean of the differences calculated at step S410, and calculate a gap value for each of the SPs existing within the predetermined distance, at step S420. That is, the database building device 100 may calculate the gap values for each of the SPs by calculating a mean of the differences for the respective APs. Thus, the gap value may indicate a difference value between the RSS stored in the radio map and the measured RSS for each of the SPs existing within the predetermined distance from the arbitrary SP.

Then, the database building device 100 may calculate a standard deviation of the gap values calculated at step S420, at step S430. That is, the database building device 100 may calculate the standard deviation of the gap values, and digitalize the distribution of the gap values.

After step S430, the database building device 100 may calculate the gap ratio by dividing a difference between the smallest value and the second smallest value among the gap values calculated at step S420, by the standard deviation, at step S440. As illustrated in FIG. 10, the smallest value among the calculated gap values may be defined as first NN, and the second smallest value may be defined as second NN. That is, the gap ratio may indicate a difference in RSS stored in the radio map between an arbitrary SP and an SP adjacent to the arbitrary SP.

Then, the database building device 100 may check whether the gap ratio calculated at step S440 is equal to or less than a predetermined ratio, at step S450. That is, because the arbitrary SP and the SP adjacent to the arbitrary SP are different from each other, the SPs can be utilized as data for positioning only when the gap values are different from each other. However, when the gap ratio is equal to or less than a predetermined ratio (for example, 50%), it may indicate that the difference in RSS stored in the radio map between the arbitrary SP and the SP adjacent to the arbitrary SP is not so large. In this case, since the availability of the data stored in the arbitrary SP is suspected, the corresponding data need to be corrected.

Thus, when it is checked at step S450 that the gap ratio is equal to or less than the predetermined ratio, the database building device 100 may correct the radio map data for the arbitrary SP using a mean of the RSS stored in the radio map and the RSS measured at step S400, at step S460. That is, since the radio environment can be changed due to various environmental variations after the radio map is constructed, the database building device 100 may correct the data stored in the SP of which the gap ratio is equal to or less than the predetermined ratio, and maintain and repair the radio map. At this time, when the mean of the RSS stored in the radio map and the measured RSS is used to correct the radio map, it may consider that a momentary error occurs in the measurement at step S400. Thus, the database building device 100 may correct the radio map by applying a weight different from the mean of the RSS stored in the radio map and the measured RSS.

Referring to FIGS. 11 to 16, the fingerprinting positioning method using the built database in accordance with an exemplary embodiment of the present invention will be described as follows.

Figure 11:
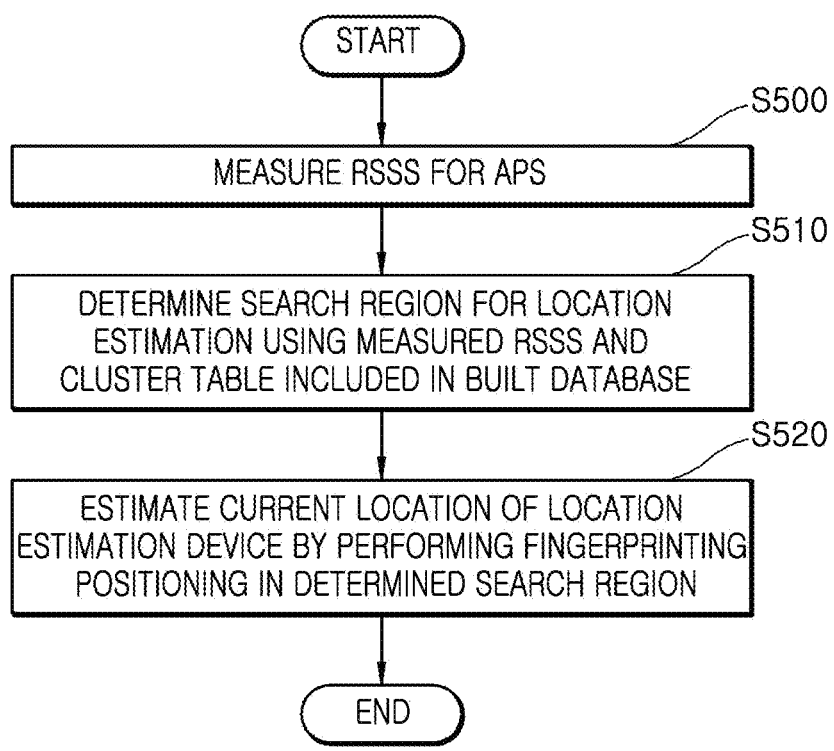
FIG. 11 is a flowchart for describing a fingerprinting positioning method using the built database in accordance with an exemplary embodiment of the present invention.

As illustrated in FIG. 11, the location estimation device 120 may measure RSSs for APs, at step S500. That is, the location estimation device 120 may estimate a location by measuring the RSSs for the respective APs at the location where the location estimation device 120 exists.

Then, the location estimation device 120 may determine a search region for location estimation, using the RSSs measured at step S500 and a cluster table included in the built database, at step S510. The built database may include the radio map which stores the RSSs for the respective APs for each SP and the cluster table which stores a center value of a cluster for each AP, generated by clustering SPs for the AP according to the RSS of the AP, and a list of SPs included in the center value. The database may indicate a database built for fingerprinting positioning.

Figure 12:
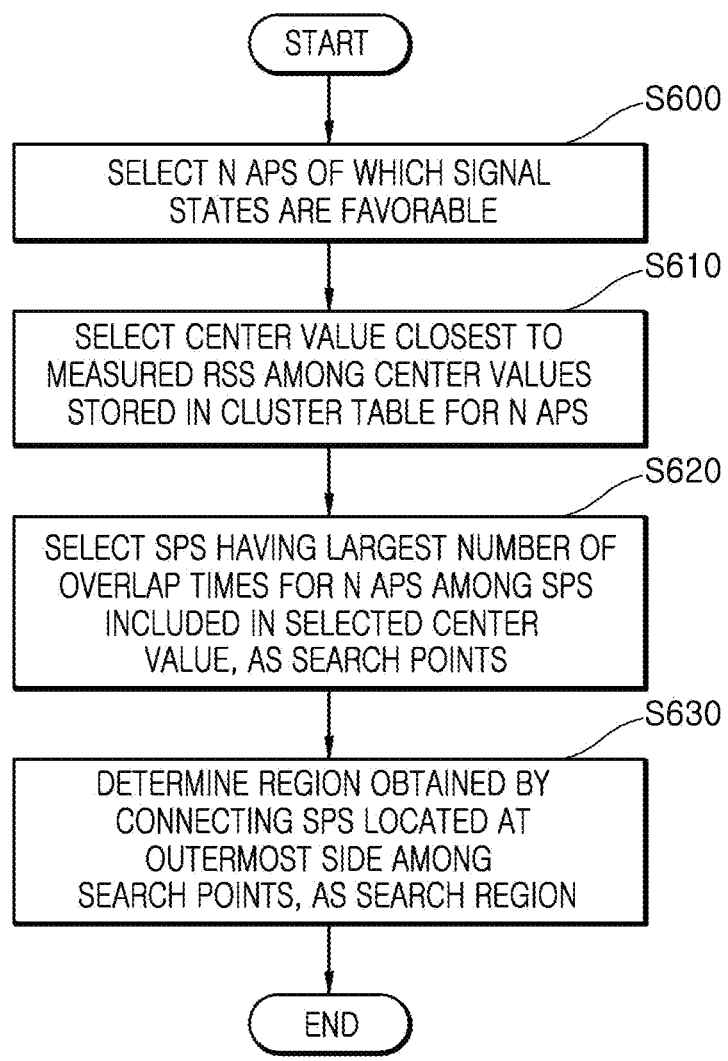
FIG. 12 is a flowchart for describing a step of determining a search region in the fingerprinting positioning method using the built database in accordance with an exemplary embodiment of the present invention.
Figure 15:
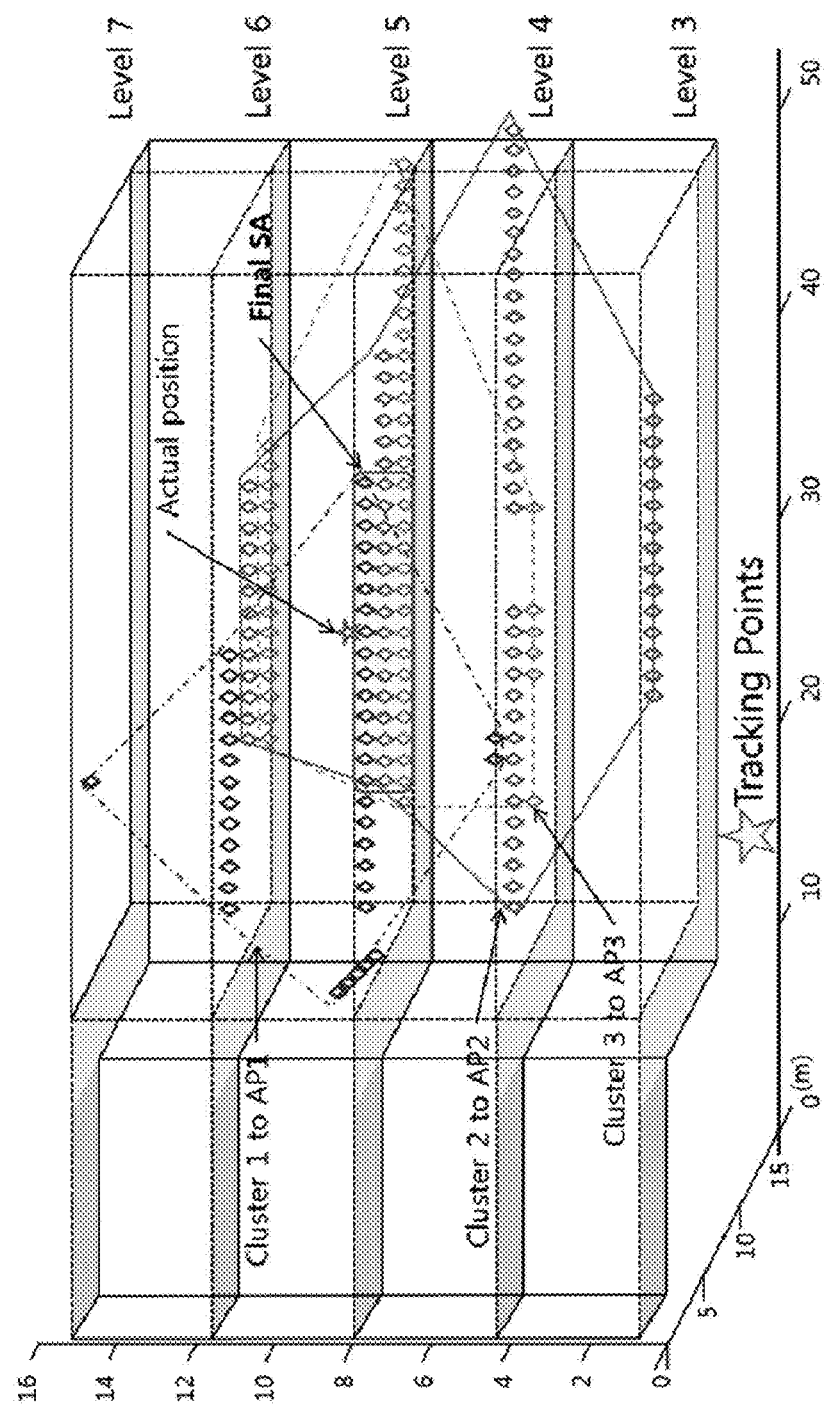
FIG. 15 is a diagram for describing a step of determining a search region in the fingerprinting positioning method using the built database in accordance with an exemplary embodiment of the present invention.

Referring to FIGS. 12 and 15, step S510 will be described in more detail as follows.

As illustrated in FIG. 12, the location estimation device 120 may select n APs of which signal states are favorable, at step S600. That is, the location estimation device 120 may select the n APs of which the signal states are favorable and determine the search region, in order to obtain high calculation speed. When the signal state is favorable, it may indicate that the RSS for the corresponding AP is relatively large.

Figure 13:
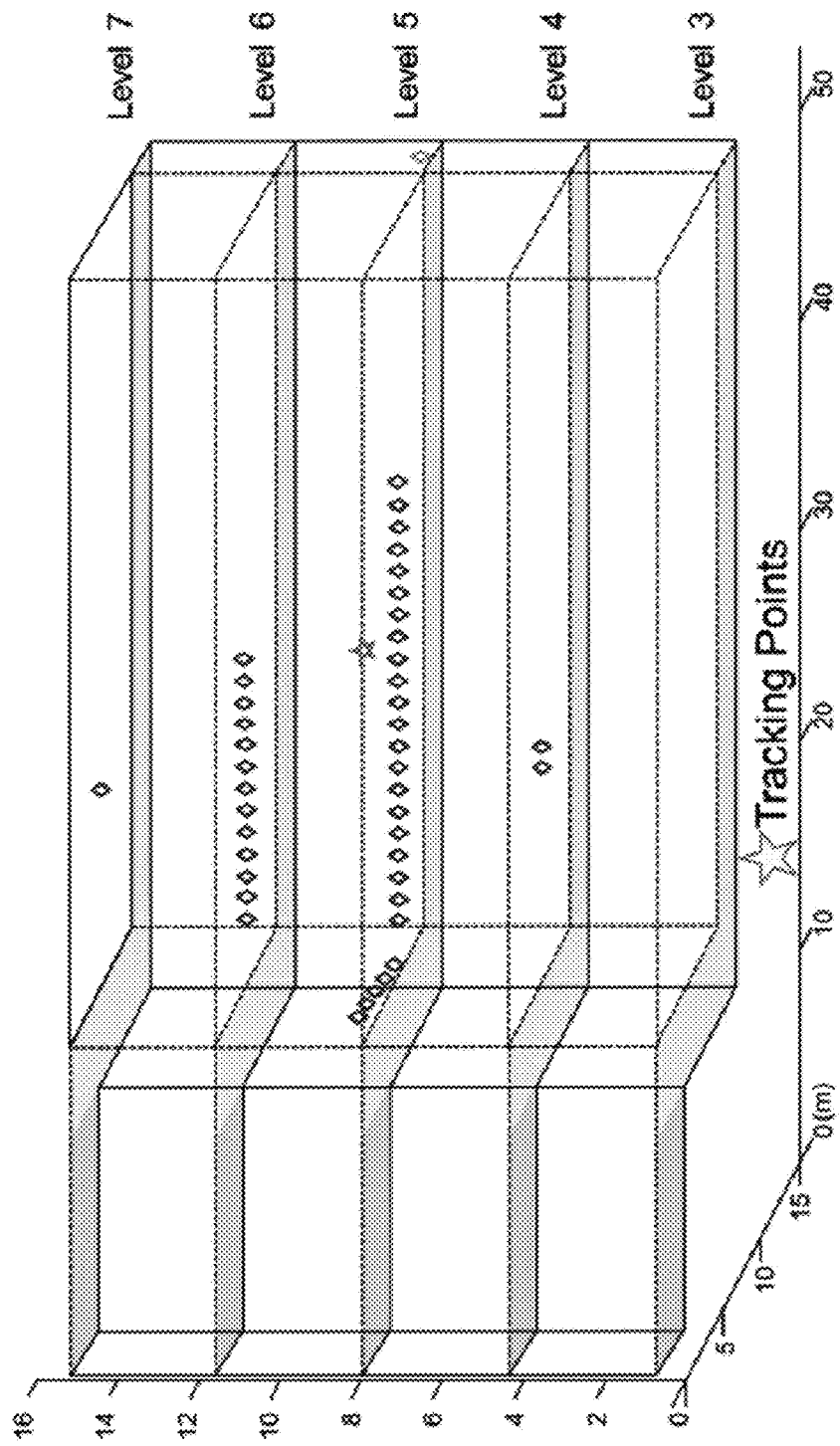
FIG. 13 is diagram for describing an SPs included in a selected center value in the fingerprinting positioning method using the built database in accordance with an exemplary embodiment of the present invention.
Figure 14:
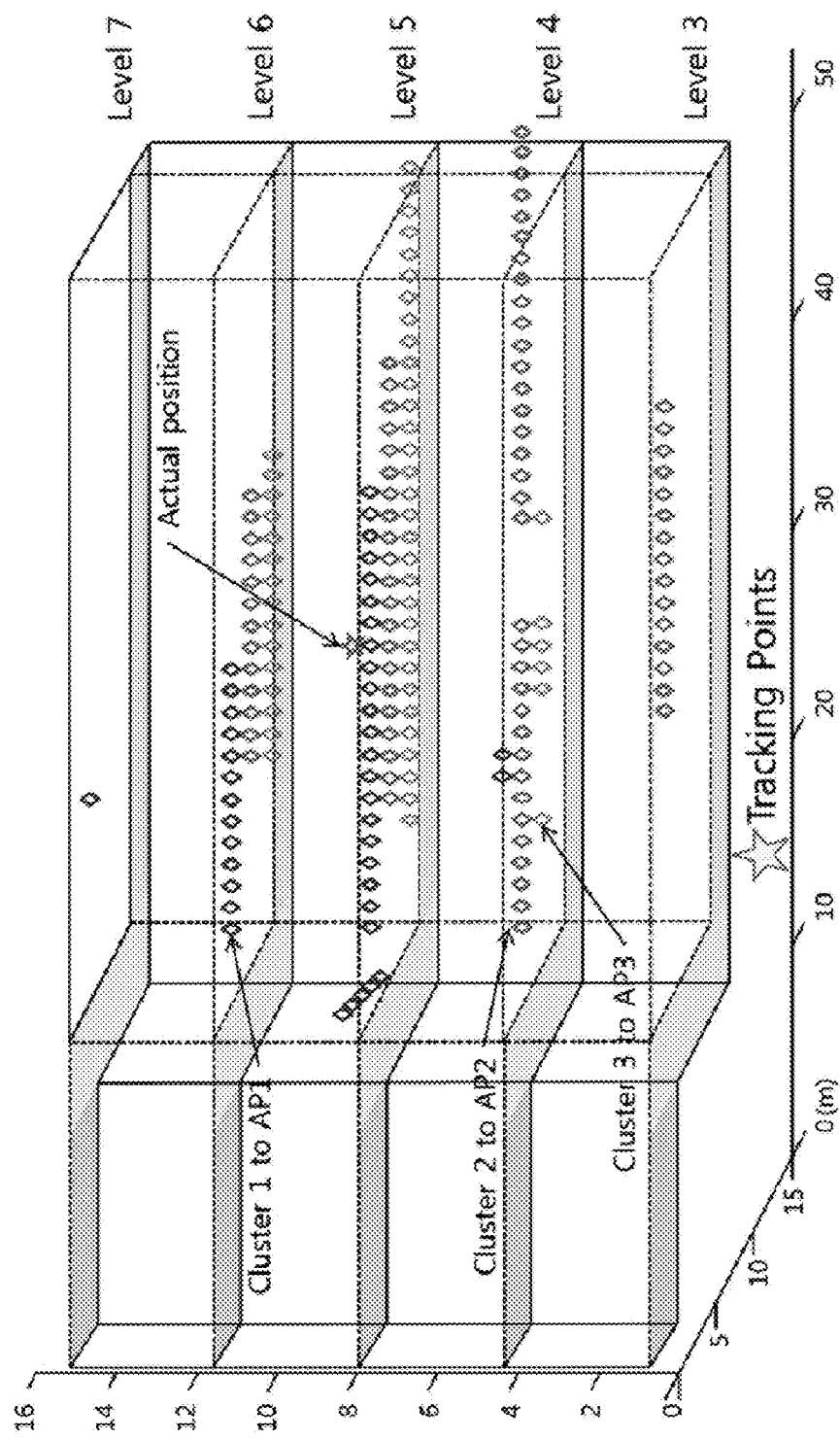
FIG. 14 is another diagram for describing an SPs included in a selected center value in the fingerprinting positioning method using the built database in accordance with an exemplary embodiment of the present invention.

Then, the location estimation device 120 may calculate a center value which is the closest to the RSSs measured at step S500 of FIG. 11, among the center values stored in the cluster table for each of the n APs selected at step S600, at step S610. That is, the location estimation device 120 may determine to which cluster the current location of the location estimation device 120 is the closest. Referring to FIGS. 13 and 14, this will be described in more detail as follows.

FIG. 13 illustrates a case in which only one AP is recognized. As illustrated in FIG. 13, the location estimation device 120 may select the center value of the cluster which is judged to be the closest to the current location of the location estimation device 120. At this time, the location estimation device may compare the center values of the clusters for the corresponding AP to the measured RSS, and select the center value having the smallest difference as the center value of the cluster which is judged to be the closest to the current position of the location estimation device 120. The location estimation device 120 may use SPs included in the selected center value as data for positioning, as illustrated in FIG. 13.

FIG. 14 illustrates the case in which three APs are recognized. FIG. 14 illustrates SPs included in the center value selected for each of the APs through the same method as that of FIG. 13.

After step S610 in FIG. 12, the location estimation device 120 may select SPs having the largest number of overlap times for n APs, among SPs included in the center values selected at step S620, as search points, at step S620. That is, as illustrated in FIG. 15, 15 SPs overlapping all of the three APs can be selected as search points. At this time, because there may exist no SPs which overlap all of the n APs, the SPs having the largest number of overlap times may be selected as the search points.

Then, the location estimation device 120 may determine a region obtained by connecting SPs positioned at the outermost side among the search points selected at step S620, as a search region at step S630. That is, the final SA illustrated in FIG. 15 may be determined as the search region. The reason that the location estimation device 120 determines the region obtained by connecting the SPs located at the outermost side among the selected search points as the search region is that, an SP in the middle of the region obtained by connecting the SPs located at the outermost side among the selected search points may not be selected as a search point due to a momentary environment change. Although several SPs are added to the search region, the SPs do not have a lot of influence on the location estimation precision and the location determination speed.

In addition, the location estimation device 120 may determine only the search points selected at step S620 as a search region.

Figure 16:
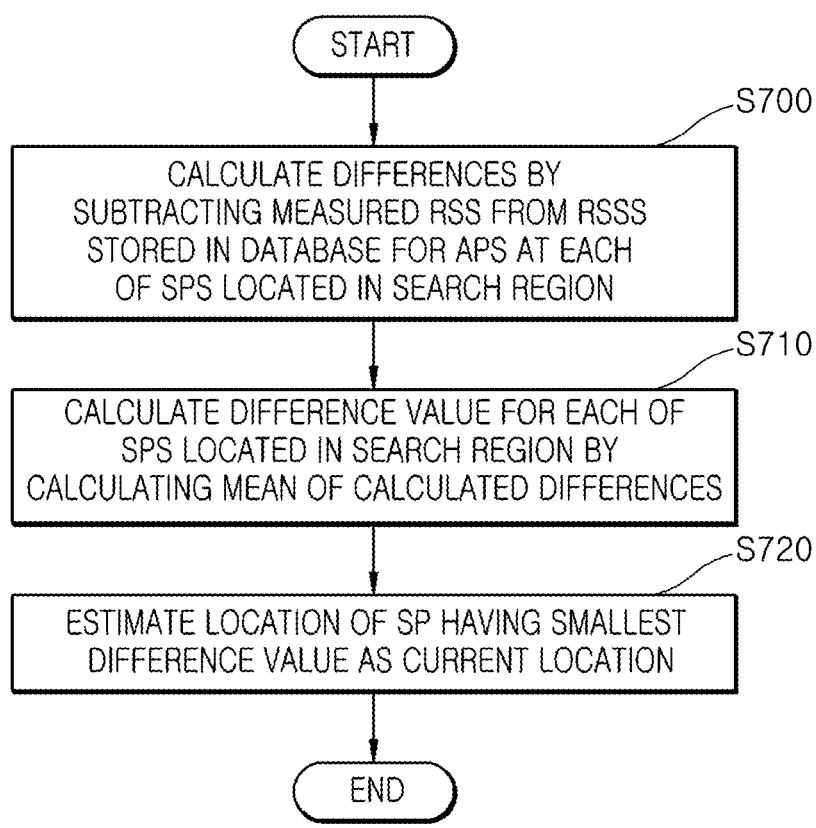
FIG. 16 is a flowchart for describing a step of estimating a current location in the fingerprinting positioning method using the built database in accordance with an exemplary embodiment of the present invention.

After step S510 of FIG. 11, the location estimation device 120 may estimate the current position of the location estimation device 120 by performing fingerprinting positioning in the search region determined at step S510, at step S520. That is, the location estimation device 120 may not perform fingerprinting positioning in the entire region, but perform fingerprinting positioning only in the search region determined at step S510, using the cluster table. Thus, the location estimation device 120 can improve the location estimation precision, and exhibit high processing speed. Referring to FIG. 16, step S520 will be described in more detail as follows.

As illustrated in FIG. 16, the location estimation device 120 may calculate differences by subtracting the RSS measured at step S500 from the RSSs stored in the database for the respective APs for each of the SPs located in the search region, at step S700. That is, the location estimation device 120 calculate the differences between the measured RSS and the RSSs stored in the database for the respective APs for each of the SPs located in the search region, in order to compare the measured RSS and the data stored in the radio map.

Then, the location estimation device 120 may calculate a mean of the differences calculated at step S700, and calculate a difference value, for each of the SPs located in the search region, at step S710. That is, the database building device 100 may calculate the difference value, for each of the SPs, by calculating a mean of the differences of the respective APs. Thus, the difference value may indicate a difference between the RSS stored in the database for each of the SPs located in the search region and the measured RSS.

After step S710, the location estimation device 120 may estimate the location of the SP, having the smallest difference value among the SPs located in the search region, as the current location of the location estimation device 120, at step S720. That is, the location estimation device 120 may estimate the location at which the difference between the RSS stored in the database and the measured RSS is the smallest, as the location of the location estimation device 120.

In addition, the location estimation device 120 may estimate the current location of the location estimation device 120 using a k-NN (k-Nearest Neighbors) method based on the difference values calculated at step S710. That is, the location estimation device 120 may estimate the current location of the location estimation device by calculating a spatial center value of k SPs from the sample point having the smallest difference value to a sample point having k-th smallest difference value.

As such, the method for building a database for fingerprinting positioning and the fingerprinting positioning method using the built database in accordance with the embodiment of the present invention may cluster SPs according to the RSS, and perform fingerprinting positioning in the search region instead of the entire region, thereby improving the location precision and determining a location at high speed.

Furthermore, the method for building a database for fingerprinting positioning and the fingerprinting positioning method using the built database in accordance with the embodiment of the present invention may build the radio map by deleting data of which the RSS measurement rates are equal to or less than the predetermined reference value and data of which RSS deviations are less than the reference value, and correct the radio map data for an SP having a low gap ratio, thereby reducing the volume of the database, improving the precision of location estimation, and determining a location at high speed.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A method for building a database for fingerprinting positioning, comprising:
generating, by a database building device, raw data by collecting received signal strengths (RSSs) for access points (APs) at each sample point (SP);
generating a cluster table by clustering SPs for each of the APs according to the RSS for the AP, using the generated raw data; and
building, by the database building device, a radio map by deleting data of which RSS measurement rates are equal to or less than a predetermined reference value, from the generated raw data, wherein:
the generating of the cluster table comprises:
estimating, by the database building device, a signal attenuation rate per distance in a state where the SP having the maximum RSS is set to the start point;
determining the number of clusters according to the estimated signal attenuation rate per distance;
calculating the initial center value of a cluster based on a difference between the maximum value and the minimum value of the RSS and the number of clusters for an arbitrary AP; and
calculating a final center value of the cluster for the arbitrary AP by performing an unsupervised learning algorithm using the calculated initial center value as a start value;
in the generating of the raw data, the database building device generates the raw data by repetitively measuring the RSSs for the respective APs at each SP; and
in the calculating of the initial center value based on the difference between the maximum value and the minimum value of the RSS and the number of clusters, the database building device calculates the center value of an m-th cluster by the following equation:

$$R_{min} + \left(m - \frac{1}{2}\right) \times \frac{R_{max} - R_{min}}{CN},$$

where $R_{min}$ represents the minimum value of the RSS, $R_{max}$ represents the maximum value of the RSS, and CN represents the number of clusters.

2. The method of claim 1, further comprising, after the building of the radio map:
measuring, by the database building device, RSSs for the respective APs at an arbitrary SP;
calculating a gap ratio indicating a difference in RSS stored in the radio map between the arbitrary SP and an SP adjacent to the arbitrary SP, based on the measured RSSs; and
correcting radio map data on the arbitrary SP based on the measured RSSs, when the calculated gap ratio is equal to or less than a predetermined ratio.

3. The method of claim 2, wherein the calculating of the gap ratio comprises:
calculating, by the database building device, gap values indicating differences between the RSSs stored in the radio map and the measured RSSs for each of SPs existing within a predetermined distance from the arbitrary SP; and
calculating the gap ratio based on the calculated gap values.

4. The method of claim 3, wherein the calculating of the gap values comprises:
calculating, by the database building device, the differences by subtracting the measured RSSs from the RSSs stored in the radio map for the respective APs at each of the SPs existing within the predetermined distance; and
calculating the gap values for each of the SPs existing within the predetermined distance by calculating a mean of the differences for the respective APs, calculated for each of the SPs.

5. A method for building a database for fingerprinting positioning, comprising:
generating, by a database building device, raw data by collecting received signal strengths (RSSs) for access points (APs) at each sample point (SP);

generating a cluster table by clustering SPs for each of the APs according to the RSS for the AP, using the generated raw data;

building, by the database building device, a radio map by deleting data of which RSS measurement rates are equal to or less than a predetermined reference value, from the generated raw data;

measuring, by the database building device, RSSs for the respective APs at an arbitrary SP;

calculating a gap ratio indicating a difference in RSS stored in the radio map between the arbitrary SP and an SP adjacent to the arbitrary SP, based on the measured RSSs; and correcting radio map data on the arbitrary SP based on the measured RSSs, when the calculated gap ratio is equal to or less than a predetermined ratio, wherein:

in the generating of the raw data, the database building device generates the raw data by repetitively measuring the RSSs for the respective APs at each SP;

the calculating of the gap ratio comprises:
calculating, by the database building device, gap values indicating differences between the RSSs stored in the radio map and the measured RSSs for each of SPs existing within a predetermined distance from the arbitrary SP; and
calculating the gap ratio based on the calculated gap values; and the calculating of the gap ratio based on the calculated gap values comprises:
calculating, by the database building device, a standard deviation of the calculated gap values; and
calculating the gap ratio by dividing a difference between the smallest value and the second smallest value among the calculated gap values by the calculated standard deviation.

6. The method of claim 1, further comprising building, by the database building device, a radio map by deleting data of which RSS deviations are less than a reference value at each of the APs, from the generated raw data.

7. A fingerprinting positioning method using a built database, comprising:

measuring, by a location estimation device, received signal strengths (RSSs) for access points (APs);

determining a search region for location estimation using the measured RSSs and a cluster table contained in the built database; and estimating a current location of the location estimation device by performing fingerprinting positioning in the determined search region, wherein:

the built database comprises a radio map and the cluster table, and is built for fingerprinting positioning;

the radio map stores the RSSs for the respective APs at each SP;

the cluster table stores a center value of a cluster for each of the APs, generated by clustering SPs for the AP according to the RSS for the AP, and a list of SPs included in the center value;

the determining of the search region comprises:
selecting, by the location estimation device, a center value which is the closest to the measured RSS among the center values stored in the cluster table, for each of the APs; and
determining the search region based on SPs included in the selected center values;

in the selecting of the center value which is the closest to the measured RSS, the location estimation device selects n APs of which signal states are favorable, and selects the center values for the n APs;

the determining of the search region based on the SPs comprises:
selecting, by the location estimation device, SPs having the largest number of overlap times for the n APs among the SPs, as search points; and
determining the search region based on the selected search points; and in the determining of the search region based on the search points, the location estimation device determines a region obtained by connecting SPs located at the outermost side among the search points, as the search region.

8. The fingerprinting positioning method of claim 7, wherein the estimating of the current location comprises:
calculating, by the location estimation device, a difference value indicating a difference between the RSS stored in the database and the measured RSS, for each of the SPs located in the search region; and
estimating the current location based on the calculated difference values.

9. The fingerprinting positioning method of claim 8, wherein the calculating of the difference value comprises:
calculating, by the location estimation device, differences by subtracting the measured RSS from the RSSs stored in the database for the respective APs at each of the SPs located in the search region; and
calculating the difference value for each of the SPs located in the search region by calculating a mean of the calculated differences for each of the SPs.

10. The fingerprinting positioning method of claim 8, wherein, in the estimating of the current location based on the difference values, the location estimation device estimates the location of the SP having the smallest difference value among the SPs located in the search region, as the current location.

11. The fingerprinting positioning method of claim 8, wherein, in the estimating of the current location based on the difference values, the location estimation device estimates the current location using a K-NN (k-Nearest Neighbors) method based on the difference values.

* * * * *